Dec. 20, 1927.  
J. T. LANFRANCHI  
1,653,218  
SHOCK PROTECTOR CAPABLE OF ACTING AS LIFTING JACK  
Filed Dec. 22, 1926  3 Sheets-Sheet 1

Inventor:  
Jean Toussaint Lanfranchi  
by Kenning & Kenning  
Attorneys

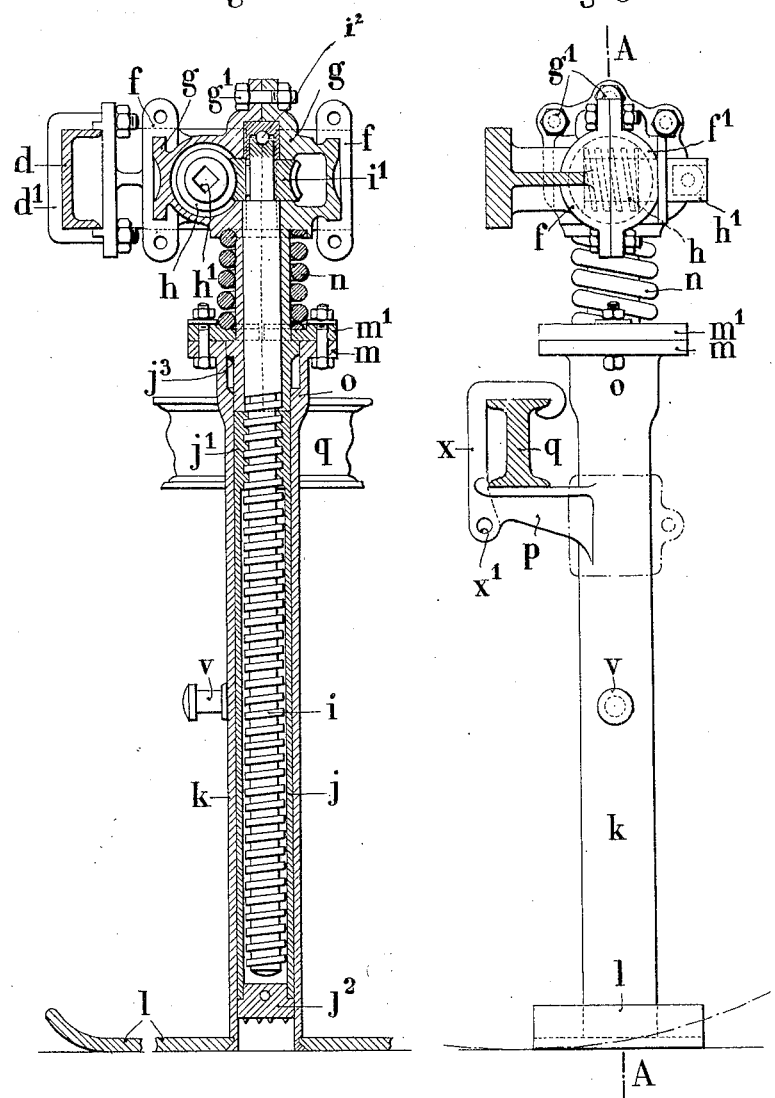

Dec. 20, 1927.  
J. T. LANFRANCHI  
1,653,218  
SHOCK PROTECTOR CAPABLE OF ACTING AS LIFTING JACK  
Filed Dec. 22, 1926   3 Sheets-Sheet 3
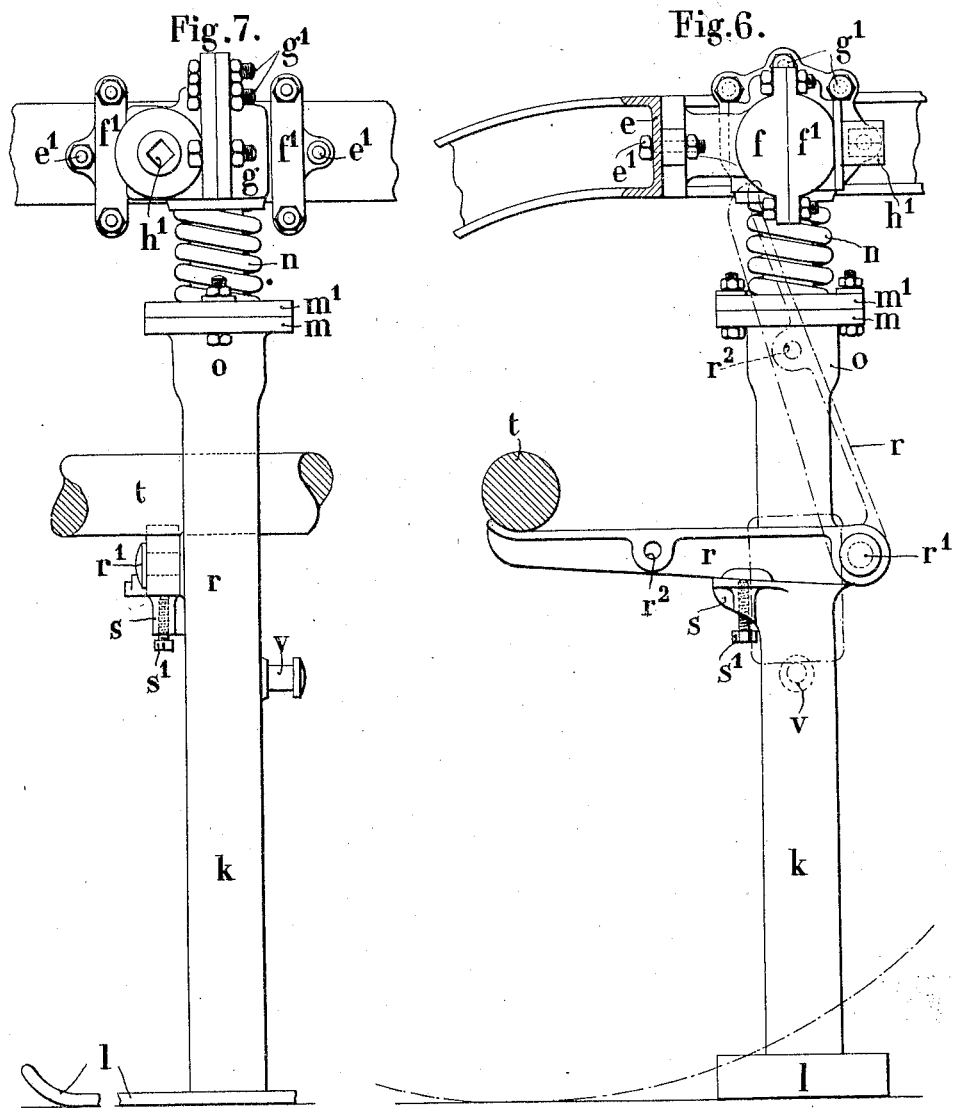
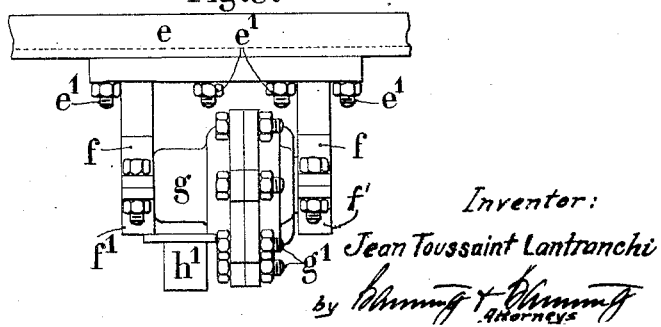
Inventor:  
Jean Toussaint Lanfranchi  
by *[signature]*  
Attorneys Patented Dec. 20, 1927.

1,653,218

UNITED STATES PATENT OFFICE.

JEAN TOUSSAINT LANFRANCHI, OF PARIS, FRANCE, ASSIGNOR TO NATHAN J. GARFUNKEL AND BENJAMIN J. GARFUNKEL, BOTH OF NEW YORK, N. Y.

SHOCK PROTECTOR CAPABLE OF ACTING AS LIFTING JACK.

Application filed December 22, 1926, Serial No. 156,372, and in France November 8, 1926.

The present invention has for object a system particularly applicable to motor cars, adapted to normally serve as a shock-protector and capable, when this is necessary, of being used as a lifting-jack.

The invention is essentially characterized by the fact that each wheel is provided with an independent device, so that it is possible, at will, to lift a wheel, the three other wheels being left resting on the ground.

This device is itself characterized by the combination of a resiliently mounted abutment member and of a lifting member, controlled by a screw, these two members being co-axially arranged and operating independently.

This device is pivoted on an axis, so that it can be placed in an approximately horizontal position, for serving as a shock-protector, or in a vertical position for serving as a screw-jack.

The invention is moreover characterized by the fact that with the screw and nut lifting system is combined a worm and worm wheel transmission, this rendering the manipulation very simple and easy.

Another characteristic arrangement consists in the method of pivoting the device on an axis enclosed in a box or casing made in two readily separable parts, so that by removing the front part of the box, the entire system is immediately detached from the car.

Finally the invention is completed by an accessory device permitting the locking of one or more devices in the position of a screw-jack and thus preventing the theft of the car.

The invention is illustrated, but by way of example only, in the accompanying drawing in which:

Fig. 3 is an elevation, on an enlarged scale, of the new device fitted at the front;

Fig. 4 is a vertical section made according to line A—A of Fig. 3;

Fig. 5 is a plan view;

Fig. 6 is a side view of the device fitted at the rear;

Fig. 7 is a side elevation and

Fig. 8 is a plan view corresponding to Fig. 5;

Figure 1:
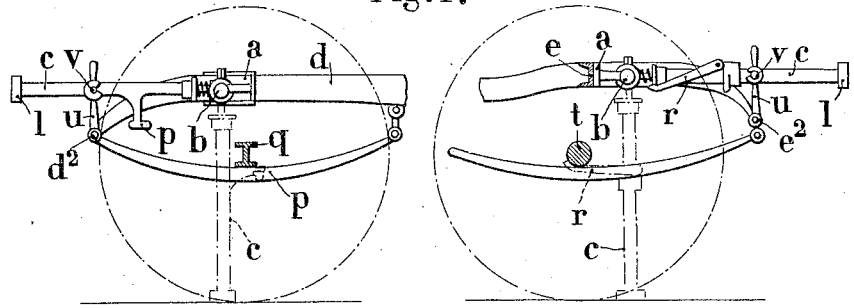
Fig. 1 is an elevation showing the front and the rear of a chassis provided with the new device.

As illustrated in the drawing, each of the devices adapted for each wheel comprises a metal fitting $a$ (Figs. 1 and 2) serving to secure it on the chassis of the car, a special joint $b$ and a part $c$ acting as a buffer and screw-jack.

The metal fitting $a$ is slightly different at the front and at the rear so that it can be fitted either on the longitudinal bearer $d$, or on the rear cross member $e$. At the front, it is secured on the longitudinal bearer by means of clamps $d^1$ (Fig. 4). At the rear it is connected to the cross member $e$ by bolts $e^1$ (Fig. 6).

The said metal fitting $a$ carries a half-box $f$ on which are bolted two members $f^1$ (Fig. 3) connected together by bolts, the whole constituting a bearing in which can rotate a bush $g$ (Fig. 4); the latter is made in two parts assembled by means of bolts $g^1$. In this bush is placed a worm $h$ (Fig. 4), gearing with a worm wheel $i^1$ rigidly secured on a screw $i$. The latter bears on a ball $i^2$; it is in engagement with a nut $j^1$ integral with a tube $j$ terminated by a head $j^2$ provided with teeth adapted to prevent the same from slipping in the ground.

About the tube $j$ is arranged another tube $k$ rigid with the buffer $l$, of suitable shape. The tube $k$ is terminated by a flange $m$ bolted on a washer $m^1$, made in two parts and bearing on a spring $n$. The flange $m$ is connected to the tube $k$ by a socket $o$, within which is housed a shoulder $j^3$ of the tube $j$.

The front device is provided with a square $p$ which fits on the axle $q$ (Fig. 3).

At the rear, the device is provided with an arm $r$ (Fig. 6) which rotates on an axis $r^1$ and can take either an off-set position, as shown in dot and dash lines, in which it is locked by a pin which is inserted in a hole $r^2$, or the operative position illustrated in full lines, in which it bears on a bracket $s$ and fits under the axle $t$.

The bracket $s$ is provided with a taking up screw $s^1$ for compensating the collapsing of the spring.

Figure 9:
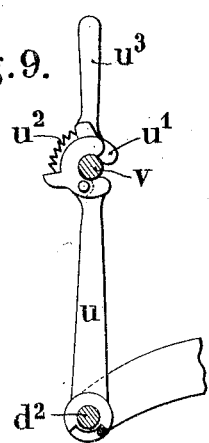
Figs. 9 and 10 illustrate the locking means serving to hold the system in position for running.
Figure 10:
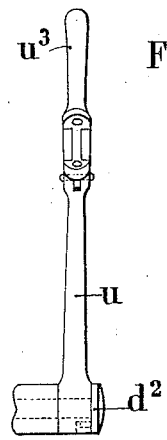

The devices are held in the position for running by means of hooks $u$ (Figs. 9 and 10) turning on the axes of the joints $d^2$ and $e^2$ of the springs (Fig. 1). These hooks engage with a stud $v$ secured on the side of the outer tube of each device (Fig. 4). For that purpose, they are provided with a movable hook $u^1$, pressed by a spring $u^2$ and provided with operating handles $u^3$ permitting their release.

The operation is as follows:

In the position for running, the four devices are in the horizontal position, as shown in Fig. 1.

If one of the buffers $l$ receives a shock it yields under this shock by compressing the spring $n$. In this movement, the tube $k$ carrying the buffer longitudinally slides on the tube $j$, the lifting members do not move.

If it is desired to lift a front wheel, the corresponding device is lowered. For that purpose, the hook $u$ is first released by acting on the handle $u^3$ and the system is made to pivot about the axis $b$ for bringing it in the vertical position illustrated in dot and dash lines. The square $p$ comes underneath the axle $q$, in proximity to the wheel to be lifted.

The end of a T-shaped wrench is then inserted into the square opening $h^1$ (Fig. 4) and the worm $i^1$ and, consequently, the screw $i$, are caused to rotate. The nut $j^1$ is vertically moved and the toothed head $j^2$ comes in contact with the ground; it lifts the tube $k$ carrying the square $p$ and with the latter the axle as well as the desired wheel.

Figure 2:
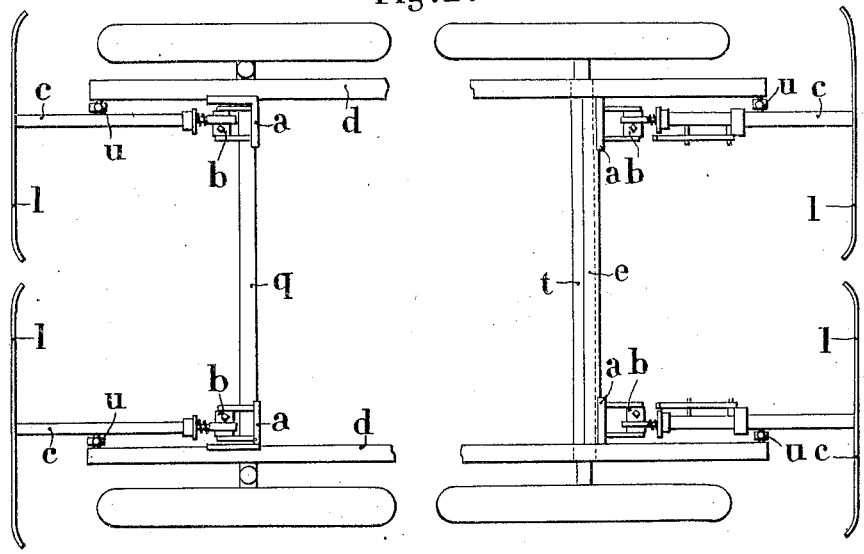
Fig. 2 is a corresponding plan view.

Being in this position, illustrated in detail in Figs. 2 and 3, if it is desired to lock the car so as to prevent the theft of the same, a hook $x$ is fitted over the axle (Fig. 3) and a padlock is engaged in an eye $x^1$ which renders this hook rigid with the square $p$.

When it is desired to restore to the position for running, the padlock is removed; then the lifting members are caused to rotate in reverse direction, until the screw $i$ has completely entered the tube $j$. The square $p$ ceases to be in contact with the axle, the device is made to rock and the stud $v$ is inserted in the hook $u$ which holds it in its horizontal position.

If a rear wheel is to be lifted, the same method of procedure is adopted. But, before having completely brought back the system into the vertical position, the pin is removed from the arm $r$ (Fig. 6) for allowing it to take the position shown in full lines. The tube $k$ is completely brought back to vertical position, thus causing the said arm to come in engagement with the axle $t$. The remainder of the operation is effected as for a front wheel.

From the foregoing, it will be understood that the passage from the position of shock-protector to that of screw-jack is effected with great ease and very rapidly.

The new device thus has multiple functions:

1. It serves as shock-protector;
2. It serves as an independent lifting-jack for each wheel;
3. It serves as a theft-preventing apparatus by lifting one of the wheels and by rendering the apparatus brought to vertical position, rigid with the car by a safety locking device.

It will be noted that the spring $n$ is exteriorly arranged so that it can always be ascertained if it is in good condition. Moreover, this spring can be as powerful as desired.

The above arrangements are of course given by way of example only; all constructional details, forms, dimensions and materials used can be varied according to circumstances without departing thereby from the principle of the invention.

Claims:—

1. In a motor car, an independent device for each wheel and capable of serving as a shock-protector and as screw-jack, means for permitting this device to rock, means for absorbing the shocks when it is in running position, means for lifting the wheel when it is to serve as a screw-jack, the means for absorbing the shocks and the means for lifting the wheel being independent from each other and co-axially arranged.

2. In a motor car, an independent device for each wheel and capable of serving as a shock-protector and as screw-jack, means for permitting the device to rock, abutment members, a resilient system serving as a bearing for these members, a worm and worm wheel control for producing the lifting.

3. In a motor car, an independent device fitted to each wheel and capable of serving as a shock-protector and as screw-jack, a box secured to the chassis, a pivotal axis for this box, a telescopic system carrying an abutment, a worm and worm wheel control actuating a head coming in engagement with the ground for lifting the wheel.

4. In a motor car, an independent device for each wheel and capable of serving as a shock-protector and as screw-jack, a box secured to the chassis, a pivotal axis for this box, a telescopic system carrying an abutment, a worm and worm wheel control actuating a head coming in engagement with the ground for lifting the wheel, jointed arms which can be placed in operative position for lifting the axle.

5. In a motor car, an independent device for each wheel and capable of serving as a shock-protector and as screw-jack, a box secured to the chassis, a pivotal axis for this box, a telescopic system carrying an abutment, a worm and worm wheel control actuating a head coming in engagement with the ground for lifting the wheel, pivoted arms which can be placed in operative position for lifting the axle, adjusting means for the said arms.

6. In a motor car, an independent device for each wheel and capable of serving as a shock-protector and as screw-jack, a box secured on the chassis, this box being made in two parts and opening easily, a pivotal axis for this box, a telescopic system carrying an abutment, a worm and worm wheel control actuating a head coming in engagement with the ground for lifting the wheel.

7. In a motor car, an independent device for each wheel and capable of serving as a shock-protector and as screw-jack, a hollow box secured on the chassis, this box being made in two parts and opening easily, a pivotal axis for this box, a telescopic system carrying an abutment, a worm and worm wheel control placed in the said box and actuating a head coming in engagement with the ground for lifting the wheel.

8. In a motor car, an independent device for each wheel and capable of serving as a shock-protector and as screw-jack, a tube carrying an abutment member, a spring for this tube, a screw and a tube-nut co-axial with the preceding tube, a worm and worm wheel control for the said screw.

9. In a motor car, an independent device for each wheel and capable of serving as a shock-protector and as screw-jack, a tube carrying an abutment member, a spring for this tube, a screw and a tube-nut co-axial with the preceding tube, a worm and worm wheel control for the said screw, means for pivoting the system and means for bringing it in position for running.

10. In a motor car, an independent device for each wheel and capable of serving as a shock-protector and as screw-jack, a box secured to the chassis, a worm and a worm wheel in the said box, a pivotal axis for this box, a screw rigid with the worm wheel, a tube-nut cooperating with the screw, an outer tube sliding on the tube-nut, a spring for the latter tube.

11. In a motor car, an independent device for each wheel and capable of serving as a shock-protector and as screw-jack, means for permitting this device to rock, means for absorbing the shocks when it is in running position, means for lifting the wheel when it is to serve as a screw-jack, locking means immobilizing the system in position for lifting.

The foregoing specification of my "shock-protector capable of acting as a lifting-jack" signed by me this 7th day of December, 1926.

JEAN TOUSSAINT LANFRANCHI.